(12) United States Patent
Masuda et al.

(10) Patent No.: US 7,386,810 B2
(45) Date of Patent: Jun. 10, 2008

(54) INFORMATION PROCESSING APPARATUS AND METHOD, AND INFORMATION PROCESSING PROGRAM

(75) Inventors: Hiroki Masuda, Kanagawa (JP); Masakazu Hayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 581 days.

(21) Appl. No.: 10/267,394

(22) Filed: Oct. 9, 2002

(65) Prior Publication Data
US 2003/0090528 A1 May 15, 2003

(30) Foreign Application Priority Data
Oct. 11, 2001 (JP) ............................. 2001-314541

(51) Int. Cl.
*G06F 17/00* (2006.01)
(52) U.S. Cl. ............... 715/838; 715/726; 715/841; 715/799; 382/224
(58) Field of Classification Search ........ 715/835–838, 715/822, 840, 846, 726, 799–802, 810, 841; 382/260, 254, 224; 345/619, 625
See application file for complete search history.

(56) References Cited

U.S. PATENT DOCUMENTS

| 6,118,480 A * | 9/2000 | Anderson et al. ...... 348/207.99 |
| 6,393,163 B1 * | 5/2002 | Burt et al. ................... 382/294 |
| 6,680,749 B1 * | 1/2004 | Anderson et al. ...... 348/231.99 |
| 6,784,905 B2 * | 8/2004 | Brown et al. ................ 715/865 |
| 6,868,189 B1 * | 3/2005 | Hoshino ..................... 382/260 |
| 6,937,775 B2 * | 8/2005 | Gindele et al. ............. 382/254 |
| 6,941,323 B1 * | 9/2005 | Galperin .................. 707/104.1 |
| 6,964,025 B2 * | 11/2005 | Angiulo et al. ............. 715/838 |
| 7,038,810 B1 * | 5/2006 | Yamazoe et al. ............ 358/1.9 |
| 2002/0085001 A1 * | 7/2002 | Taylor ........................ 345/440 |

FOREIGN PATENT DOCUMENTS

| JP | 10-210306 | 8/1998 |
| JP | 11-136528 | 5/1999 |

\* cited by examiner

*Primary Examiner*—Tadesse Hailu
(74) *Attorney, Agent, or Firm*—Oblon, Spivak, McClelland, Maier & Neustadt, P.C.

(57) ABSTRACT

To improve the convenience in picture processing of a target picture, a filtering unit (102) and patterning unit (103) are supplied with information on a target one selected by a touch pad (6) from a plurality of pictures to minify to thumbnail information, and apply various kinds of filtering and patterning to the target picture information, the thumbnail information are supplied to a display control unit (104) for display in display areas, and the filtering unit (102) and patterning unit (103) are controlled by a controller (105) to detect the kind of the picture processing applied to one selected by the touch pad (6) from the plurality of thumbnails being displayed and apply it to the target picture.

14 Claims, 8 Drawing Sheets

INFORMATION PROCESSING APPARATUS AND METHOD, AND INFORMATION PROCESSING PROGRAM

BACKGROUND OF THE INVENTION

1. Field of the Invention

The present invention relates to an information processing apparatus and method and an information processing program, and more particularly, to an information processing apparatus and method, and an information processing program, intended to make information processing of a picture being displayed for processing (will be referred to as "target picture" hereunder).

2. Description of the Related Art

Recently, there has been a picture viewer application software for use in the information processor such as a personal computer (PC) to arrange picture files for display.

Running an electronic photo album software as an example of the picture viewer application software, the information processor can display a picture file acquired from a digital still camera for example so that the user can view it as if he or she viewed an ordinary photo album. Also, the information processor can add an object such as a character or figure to a display area where a target picture is being displayed, modify the attribute of the object, make a simple correction and picture processing of the on-screen target picture.

When the information processor makes filtering, as one example of picture processing technique, of an on-screen target picture, it displays items of filtering such as hue change, brightness change, chroma change, contrast change, gamma correction, soft focusing, texture processing, etc. When a predetermined one is selected from the selection items being displayed and parameters necessary for the selected item are set, the information processor provides a preview display of a picture which will result from application of a filtering specified by the selected item to the on-screen target picture. Then, when the user verifies the picture being displayed for preview and operates the information processor to make a final decision, the information processor makes the filtering of the target picture.

However, the above-mentioned conventional information processor can only display the above-mentioned items of filtering for filtering a target picture being displayed. Therefore, the information processor can hardly permit the user to correctly recognize the content of each filtering technique and differences of the filtering techniques from each other, and thus it is not advantageous in viewing, practicality and convenience.

More particularly, the user has to cause the information processor to repeat operations for selecting an item of filtering, setting parameters necessary for the selected filtering item and displaying, for previewing, a picture which will result from application of the filtering to a target picture, as above, until a desired filtering is selected.

OBJECT AND SUMMARY OF THE INVENTION

Accordingly, the present invention has an object to overcome the above-mentioned drawbacks of the related art by providing an information processing apparatus and method, and an information processing program, which can make picture processing of a target picture with an improved convenience.

The above object can be attained by providing an information processor which makes picture processing of information on a target picture being displayed on a display means, the apparatus including according to the present invention:

an operating means;

a picture processing means for minifying the target picture information to thumbnail information and applying multiple kinds of picture processing of different categories to the thumbnail information;

a display control means for controlling the display means to display thereon, together with the target picture information, multiple pieces of thumbnail information having been subjected to the multiple kinds of picture processing of different categories in the picture processing means; and means for controlling, for application to the target picture information, the picture processing applied to one selected by the selecting means from the plurality of thumbnail information displayed on the display means and having been subjected to the multiple kinds of picture processing of different categories.

In the above information processor, the plurality of thumbnail information having been subjected to the multiple kinds of picture processing of different categories is displayed along with the target picture information on the display means, and the picture processing applied to one selected by the selecting means from the plurality of thumbnail information of different categories is applied to the target picture information, thereby permitting to select a final kind of picture processing with an improved convenience.

Also, the above object can be attained by providing an information processing method for processing, by an operating means, information on a target picture being displayed on a display means, the method including, according to the present invention, steps of:

minifying the target picture information to thumbnail information and applying multiple kinds of picture processing of different categories to the thumbnail information;

displaying multiple pieces of thumbnail information having been subjected to the multiple kinds of picture processing of different categories in the picture processing step, together with the target picture information, on the display means; and controlling, for application to the target picture information, the picture processing applied to one selected by the operating means from the plurality of thumbnail information displayed on the display means and having been subjected to the multiple kinds of picture processing of different categories.

In the above information processing method, the plurality of thumbnail information having been subjected to the multiple kinds of picture processing of different categories is displayed along with the target picture information on the display means, and the picture processing applied to one selected by the selecting means from the plurality of thumbnail information of different categories is applied to the target picture information, thereby permitting to select a final kind of picture processing with an improved convenience.

Also, the above object can be attained by providing an information processing program for processing, by an operating means, information on a target picture being displayed on a display means, the program including, according to the present invention, steps of:

minifying the target picture information to thumbnail information and applying multiple kinds of picture processing of different categories to the thumbnail information;

displaying multiple pieces of thumbnail information having been subjected to the multiple kinds of picture processing of different categories in the picture processing step, together with the target picture information, on the display means; and controlling, for application to the target picture information, the picture processing applied to one selected by the operating means from the plurality of thumbnail information displayed on the display means and having been subjected to the multiple kinds of picture processing of different categories.

In the above information processing program, the plurality of thumbnail information having been subjected to the multiple kinds of picture processing of different categories is displayed along with the target picture information on the display means, and the picture processing applied to one selected by the selecting means from the plurality of thumbnail information of different categories is applied to the target picture information, thereby permitting to select a final kind of picture processing with an improved convenience.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The present invention will be described in detail herebelow concerning embodiments of the information processing apparatus and method, and information processing program.

Figure 1:
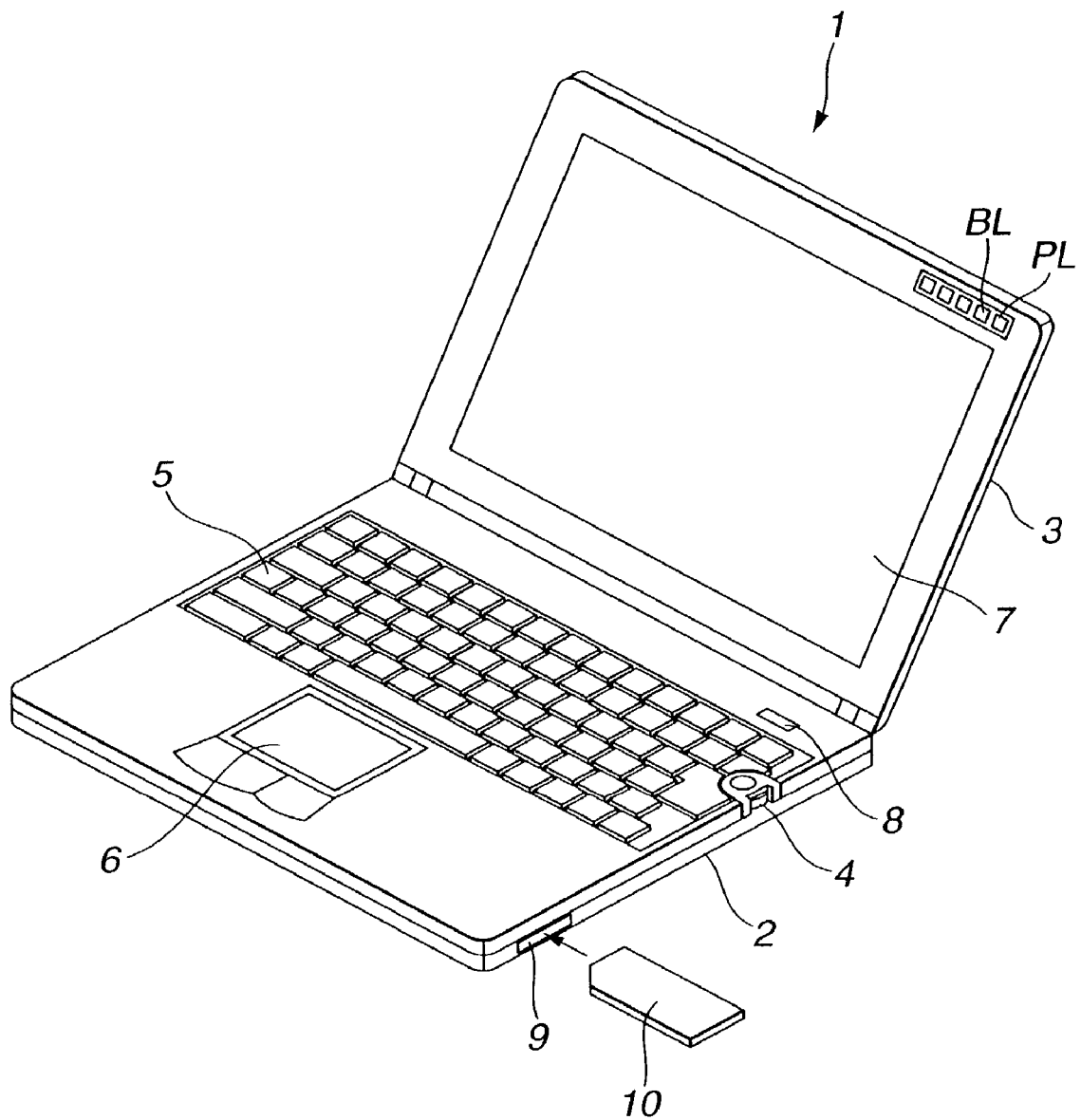
FIG. 1 shows the appearance of a notebook-sized personal computer (will be referred to as "notebook PC" hereunder) as an example to which the present invention is applied.

Referring now to FIG. 1, there is schematically shown in the form of a perspective view the appearance of a notebook-sized personal computer (will be referred to as "notebook PC" hereunder) as an example in which the information processor according to the present invention is adopted. The notebook PC is generally indicated with a reference 1. As shown, the basic components of the notebook PC 1 are a body unit 2, and a display unit 3 freely openable and closable in relation to the body unit 2. FIG. 1 shows the notebook PC 1 with the display unit 3 opened from the body unit 2.

The body unit 2 has provided on the top thereof a keyboard 5 used by the user for entry of various characters and symbols, a touch pad as a pointing device to control the pointer on the display screen, and a power switch 8. The touch pad 6 is used by the user to move the pointer to a desired position on the display screen. To operate the touch pad 6, the user touches a pad portion of the touch pad 6 and moves the finger thereon. When the pointer is moved to that position, the user clicks one of button portions of the touch pad 6. A command can thus be supplied to the notebook PC 1. It should be noted that in many cases, a so-called mouse (not shown) is also used as a pointing device. The mouse can move the pointer similarly to the touch pad 6. Also, a so-called wheel button may be used with the notebook PC 1.

Further, there is located at the upper right of the keyboard 5 of the body unit 2 a so-called jog dial 4 which is rotated and pressed to select a variety of information and make a decision. The dial portion is exposed at the right side of the body unit 2 as shown. Also, memory card slot 9, PC card slot (not shown), etc. are provided at the right side, for example, of the body unit 2. The memory card slot 9 receives a memory card 10 such as a memory stick (trademark), for example, incorporating a semiconductor memory such as a flash memory to record a still picture, moving picture, sound, text data, program, etc.

In front of the display unit 3, there is provided a liquid crystal display (LCD) 7 to display a picture thereon. Further, the display unit 3 has provided at the upper right thereof a pilot lamp PL, battery residual-potential lamp BL, and a message lamp and other LEDs as necessary.

The notebook PC 1 can acquire still or moving pictures taken using a digital still camera or digital video camera via the memory card 10.

The notebook PC 1 is designed to execute a picture viewer application software to arrange and display still pictures acquired into a hard disc.

Note that the notebook PC 1 accesses the picture viewer application software etc. from a program storage medium such as a CD-ROM (compact disc-read-only memory), hard disc or the like (not shown), loads them into a RAM (random access memory) and executes the software by means of a CPU (central processing unit).

Figure 2:
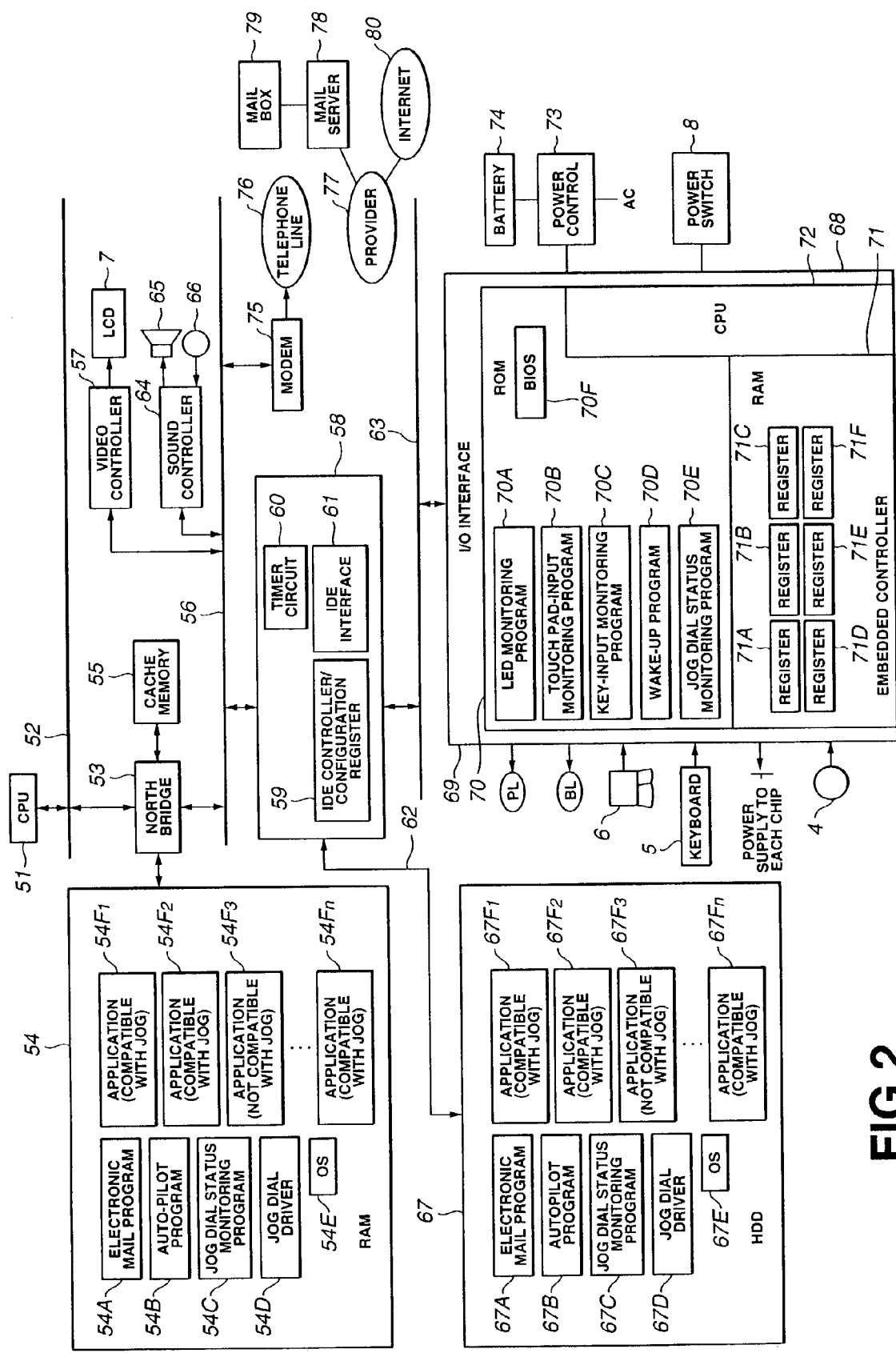
FIG. 2 is a block diagram explaining the configuration of the notebook PC in FIG. 1.

Next, an example of electrical system of the notebook PC 1 will be described with reference to the block diagram in FIG. 2. The CPU 51 is a Pentium (registered trademark) processor (by Intel), for example, and connected to a host bus 52 to which a north bridge 53 is connected. The north bridge 53 is also connected to a PCI bus 56. The north bridge 53 is formed from 400BX (by Intel) or the like to control the CPU 51, main memory 54 and its peripherals. It should be noted that the north bridge 53 and a south bridge 58 which will be described in detail later form together a chip set.

The north bridge 53 is connected to the main memory 54 and a cache memory 55 as well. The cache memory 55 caches data to be used by the CPU 51. It should be noted that the CPU 51 also incorporates a primary cache memory (not shown).

The main memory 54 is formed from a DRAM (dynamic random-access memory) for example to store a program to be executed by the CPU 51 and data necessary for operation of the CPU 51. More particularly, when the notebook PC 1 is started, the main memory 54 receives and stores an electronic mail program 54A, auto-pilot program 54B, jog dial status monitoring program 54C, jog dial driver 54D, operating system (OS) program 54E and other application programs $54F_1$ to $54F_n$ transferred from a hard disc built in a hard disc drive (HDD) 67. In the following description, the aforementioned picture viewer application software will be taken as the application program $54F_1$.

The electronic mail program 54A is used to transfer a message through a network from a communication line such as a telephone line 76 via a modem 75 which will be described in detail later. Also, the electronic mail program 54A has a special function to acquire an incoming mail. The incoming mail acquisition function is provided to check a mail server 78 included in a provider 77 for arrival of a mail addressed to the user at a mail box 79 in the mail server 79, and acquire such a user-addressed mail, if any.

The auto-pilot program 54B is used to start multiple preset kinds of processing (or programs) etc. in a predetermined sequence.

The jog dial status monitoring program 54C is intended to receive, from the application programs $54F_1$ to $54F_n$, notices of whether the application programs $54F_1$ to $54F_n$ are compatible with the jog dial, and display what can be done by operating the jog dial 4 when the application programs are compatible, for example. Normally, the jog dial status monitoring program 54C waits for an event made on the jog dial 4, and also has a list according to which notices are received from the application programs $54F_1$ to $54F_n$. Also, the jog dial driver 54D performs each of its functions correspondingly to an operation of the jog dial 4.

The OS program (operating system software) 54E is used to control the computer's basic operations such as represented by the so-called Windows 95 and 98 (both are trademarks) of the Microsoft, Mac OS (trademark) of the Apple Computers, etc.

Examples of the picture viewer application software referred to herein as the application program $54F_1$ include an electronic photo album software. The electronic photo album software arranges picture files acquired from the digital still camera or the like for viewing by the user as if he or she viewed an ordinary photo album. Also, the electronic photo album software can add an object such as a character, figure or the like to a display area where a picture is being displayed, change the attribute of the object, make simple correction and picture processing of a target picture.

A video controller 57 is also provided and connected to the PCI bus 56, and controls the display on the LCD 7 of the display unit 3 according to data supplied via the PCI bus 56.

The PCI bus 56 has connected thereto a sound controller 64 to acquire an input from a microphone 66 or supply a sound signal to a speaker 65. Also, the modem 75 is connected to the PCI bus 56. The modem 75 can be connected to a communication network 80 such as the Internet, mail server 78 and the like via a public telephone line 76 or Internet service provider 77.

Further, the PCI bus 56 has the south bright 58 connected thereto. The south bridge 58 is formed from PIIX4E (by Intel), for example, to control a variety of inputs/outputs (I/O). More specifically, the south bridge 58 is formed from an IDE (integrated drive electronics) controller/configuration register 59, timer circuit 60, IDE interface 61, etc. to control a device connected to an IDE bus 62, and a device connected via an ISA/EIO (industry standard architecture/extended input output) bus 63 and embedded controller 68.

The IDE controller/configuration register 59 is formed from two IDE controllers including a so-called primary IDE controller and secondary IDE controller, configuration register, etc. (not shown).

The primary IDE controller is connected to a connector (not shown) via the IDE bus 62, and the HDD 67 is connected to the connector. The secondary IDE controller is designed such that when a bay device as an IDE device like a CD-ROM drive, second HDD or FDD (floppy disc (registered trademark) drive) (not shown) is attached to the notebook PC 1, the connector of the bay device will electrically be connected to the secondary IDE controller via another IDE bus.

Note that the hard disc in the HDD 67 has previously stored therein an electronic mail program 67A, auto-pilot program 67B, jog dial status monitoring program 67C, jog dial driver 67D, OS program 67E and other application programs $67F_1$ to $67F_n$. The application program $67F_1$ is a picture viewer application software like the electronic photo album software. Therefore, the hard disc used in the HDD 67 serves as a program storage medium to store the information processing program according to the present invention.

The programs 67A, 67B, 67C, 67D, 67E and $67F_1$ to $67F_n$ stored in the hard disc of the HDD 67 are transferred one after another to the RAM (main memory) 54 in the process of bootstrapping, and they will temporarily be stored as the electronic mail program 54A, auto-pilot program 54B, jog dial status monitoring program 54C, jog dial driver 54D, OS program 54E and other application programs $54F_1$ to $54F_n$, respectively.

The ISA/EIO bus 63 has the embedded controller 68 connected thereto. The embedded controller 68 is formed from a micro controller and used as an I/O controller. That is, the embedded controller 68 is composed of an I/O interface 69, ROM 70, RAM 71 and CPU 72 interconnected to each other.

The ROM 70 has previously stored therein an LED control program 70A, touch-pad input monitoring program 70B, key-input monitoring program 70C, wake-up program 70D and a jog dial status monitoring program 70E.

The LED control program 70A controls the power pilot lamp PL, battery residual-potential lamp BL, message lamp and other LEDs as necessary to turn on and off. The touch-pad input monitoring program 70B monitors whether an input is supplied from the user operating the touch pad 6. The key-input monitoring program 70C monitors whether an input is supplied from the user operating the keyboard 5 or any other key switch. The wake-up program 70D checks whether a preset time is reached, based on current time data supplied from the timer circuit 60 included in the south bridge 58, and manages the power supply to each chip for starting a predetermined processing (or program) when the preset time is reached. The jog dial status monitoring program 70E monitors whether the dial of the jog dial 4 has been rotated or pressed.

The ROM 70 has further a basic input/output system (BIOS) 70F stored therein. The "BIOS" refers to a basic input/output system, and is a software program to control data transfer (input/output) between the OS or application software and the peripheral device (LCD 7, keyboard 5, HDD 67 or the like).

The RAM 71 has an LED control register, touch-pad input status register, key-input status register, set-time register, and a jog dial status monitoring I/O register as registers 71A to 71F. For example, the LED control register 71A turns on the message lamp indicating an instantaneous start-up of the mail when the jog dial 4 is pressed. The key-input status register 71C stores an operation-key flag when the jog dial 4 is pressed for a one-touch operation which will be described in detail later. The set-time register 71D can freely set a time.

Also, the embedded controller 68 has connected thereto the jog dial 4, touch pad 6 and keyboard 5 via connectors (not shown), respectively, and provides the ISA/EIO bus 63 with a signal corresponding to the operation of each of the jog dial 4, touch pad 6 and keyboard 5. The embedded controller 68 has also the power pilot lamp PL, battery residual-potential lamp BL, message lamp and other LEDs connected thereto.

To the embedded controller 68, there is connected a power control circuit 73 connected to a built-in battery 74 or AC source. The power control circuit 73 supplies a necessary power to each of the blocks and controls the built-in battery 74 and secondary battery of the peripheral device for charging of them. Further, the embedded controller 68 monitors the power switch 8 which is operated for connection or disconnection of the power supply.

Figure 3:
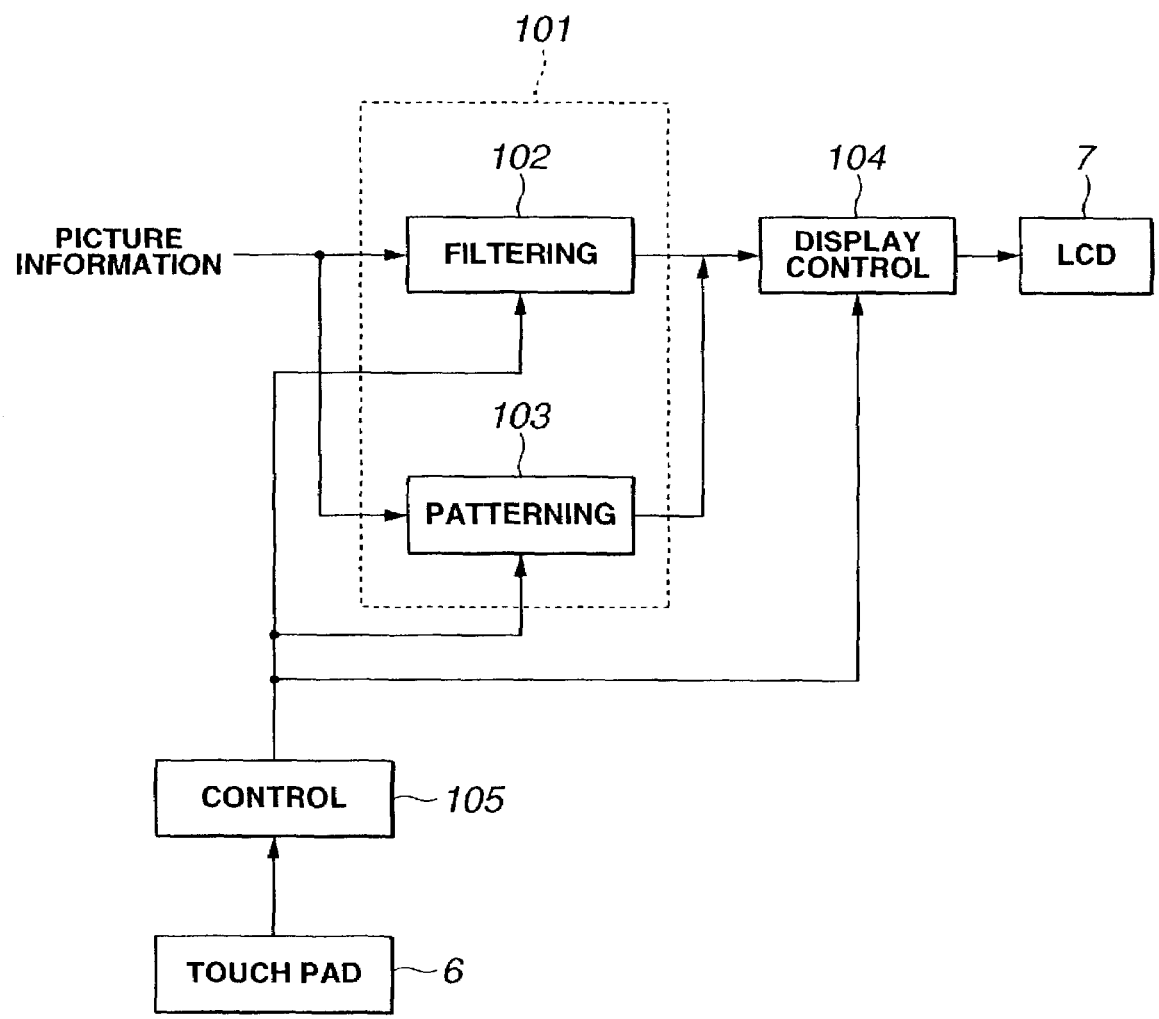
FIG. 3 is a block diagram explaining the functions of a CPU included in the notebook PC.

Note that the CPU 51 included in the notebook PC 1 may be regarded as having a picture processor 101, display control unit 104 and a controller 105 as functional blocks, respectively, as shown in FIG. 3 in a mode in which picture processing is done by the electronic photo album software read in the application program 54F$_1$ in the RAM 54.

Note that the mode in which the picture processing is done is such that the picture processing is done when at least a picture displayed in the display area on the LCD 7 is selected by operating the touch pad 6, which will be described in detail later with reference to the display screens shown in FIGS. 4 to 6. It should be noted that the picture selection is made using the touch pad 6 but it may of course be done by the aforementioned mouse, draw tablet, cursor key or the like.

In this embodiment, the picture processing consists of two categories: filtering and patterning. The filtering includes hue change, brightness change, chroma change, contrast change, gamma correction, soft focusing and texture processing, and the patterning includes extraction of a target picture with the use of a variety of patterns.

As shown in FIG. 3, the picture processor 101 includes a filtering unit 102 and patterning unit 103.

The filtering unit 102 makes the aforementioned kinds of filtering of thumbnail information obtained through minification of input information on a target picture selected by operating the touch pad 6, and supplies the filtered picture information to the display control unit 104.

The patterning unit 103 makes various kinds of patterning of thumbnail information obtained through minification of input information on a target picture similar to that in the filtering unit 102, and supplies the patterned picture information to the display control unit 104.

Note that the filtering unit 102 and patterning unit 103 are controlled by the controller 105 to make various kinds of filtering and patterning of input information on a target picture as well.

The display control unit 104 displays the thumbnail information subjected to various kinds of filtering and supplied from the filtering unit 102 and thumbnail information subjected to various kinds of patterning and supplied from the patterning unit 103 in display areas of corresponding categories on the LCD 7, respectively. At this time, the display control unit 104 displays these thumbnail information side by side in the form of a list including a predetermined number of pictures positioned vertically and horizontally in a display area of each of the categories on the LCD 7. It should be noted that when the thumbnail information cannot be displayed at a time in the display area of each category, the display control unit 104 displays the thumbnail information which cannot be displayed one after another as the scroll bar is moved by operating the touch pad 6.

The controller 105 detects the kind of picture processing applied to one selected by using the touch pad 6 from the thumbnail information being displayed in the display area of each category on the LCD 7, and controls the picture processing for application to information on the target picture supplied to the filtering unit 102 and patterning unit 103.

Next, concrete examples of display screens on the LCD 7 when the notebook PC 1 executes the electronic photo album software will be described with reference to FIGS. 4 to 6.

Figure 4:
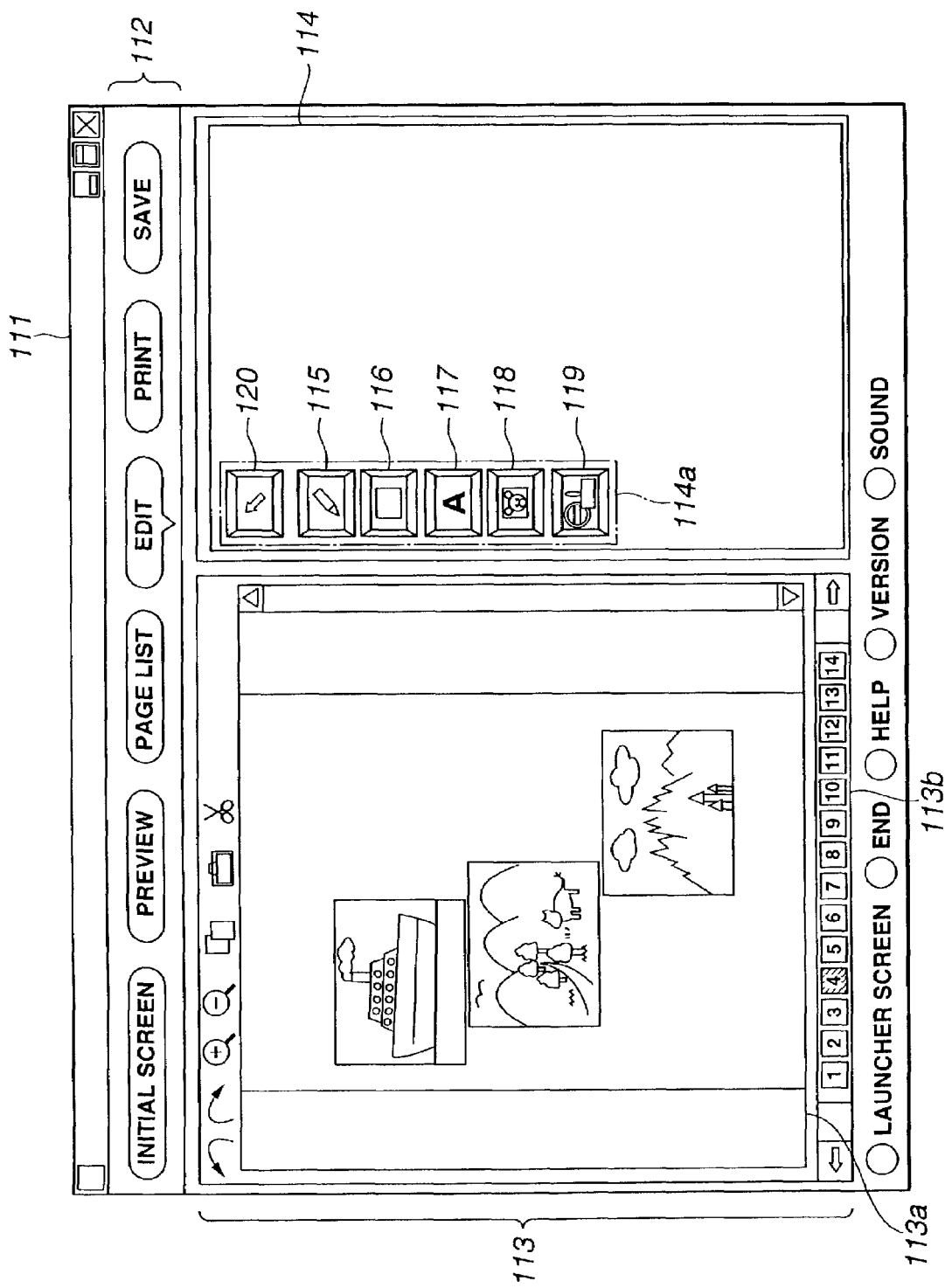
FIG. 4 shows an example display appearing on the LCD (liquid crystal display) of the notebook PC when the notebook PC executes an electronic photo album software.

FIG. 4 shows a photo album window 111 appearing when the edit menu of the electronic photo album software is executed. The photo album window 111 consists of a menu select section 112 and picture display sections 113 and 114.

The menu select section 112 shows a menu executable by the electronic photo album software. An item can be selected from the menu by the use of the touch pad 6.

The picture display section 113 includes mainly a picture display area 113a equivalent to one page of the album and where at least a picture is displayed, and a page number display area 113b where a page number for the picture display area 113a is displayed. When a predetermined picture in the picture display area 113a is selected by operating the touch pad 6, the mode of operation shifts to a one for subjecting the selected picture, namely, a target picture, to various kinds of picture processing. Also, when a predetermined page number in the page number display area 113b is selected by operating the touch pad 6, a picture in the picture display area 113a equivalent to the selected page number is displayed.

The picture display section 114 includes an edit mode select area 114a in which edit icons 115 to 120 used for various kinds of edition of pictures in at least the picture display area 113a are displayed.

When the icon 115 is selected by operating the touch pad 6, the mode of operation shifts to a one for pen-writing insertion of a line to the picture display area 113a and picture. When the icon 116 is selected by operating the touch pad 6, the mode of operation shifts to a one for insertion of a figure to the picture display area 113a and picture. When the icon 117 is selected by operating the touch pad 6, the mode of operation shifts to a one for insertion of a character to the picture display area 113a and picture. When the icon 118 is selected by operating the touch pad 6, the mode of operation shifts to a one for insertion of an illustration to the picture display area 113a and picture. When the icon 119 is selected by operating the touch pad 6, the mode of operation shifts to a one for insertion of a stamp to the picture display area 113a and picture. The icon 120 is used to terminate the pen-writing line insertion or illustration insertion.

Note that in the photo album window 111 shown in FIG. 4, pictures 201 to 203 equivalent to the fourth page are displayed in the picture display area 113a of the picture display section 113. Since the pictures 201 to 203 equivalent to the fourth page are displayed in the picture display area 113a, a portion "4" of the page number display area 113b of the picture display section 113 is changed in color. Also, only the edit icons 115 to 120 are displayed in the edit mode select area 114a of the picture display section 114.

Figure 5:
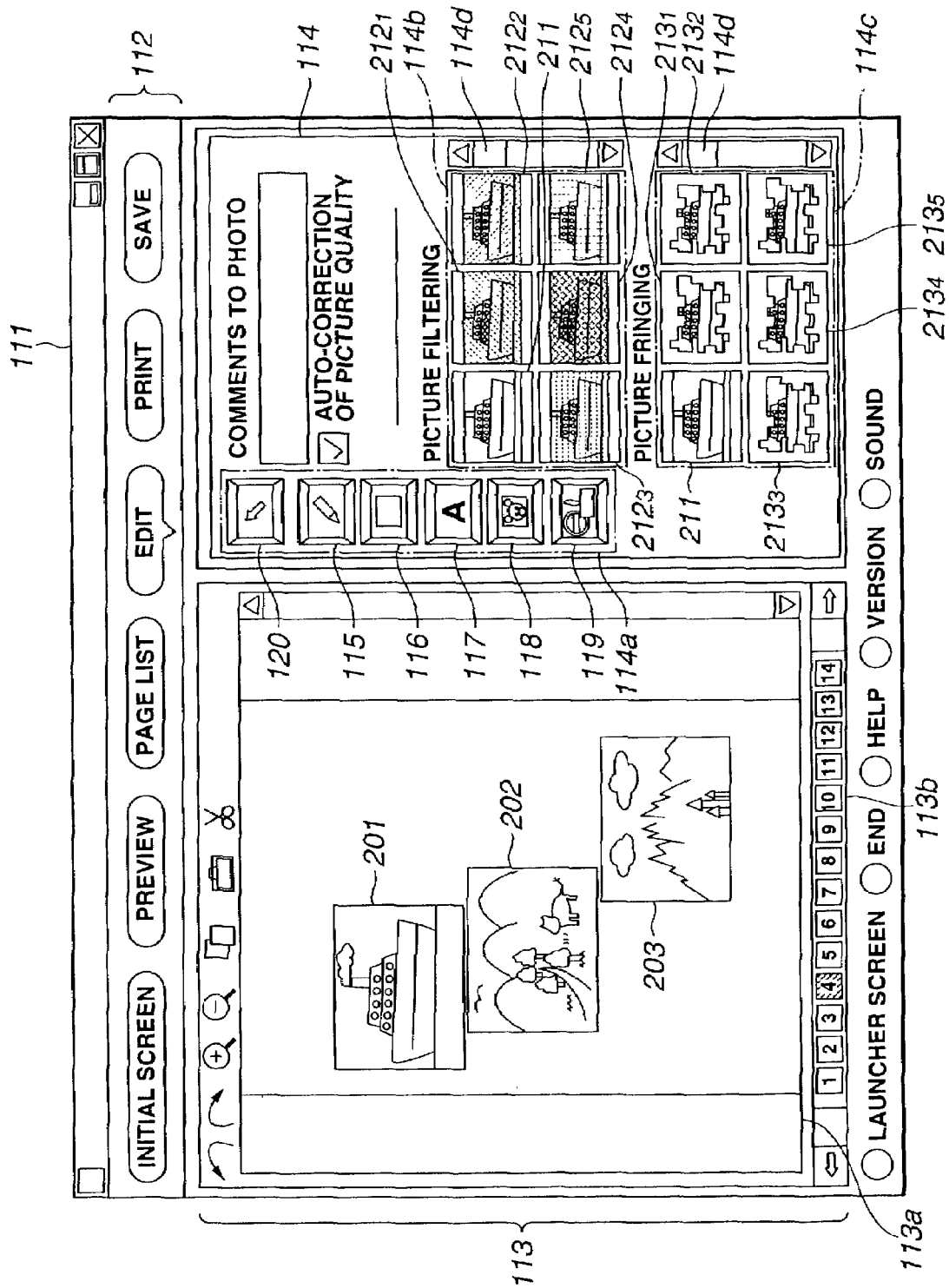
FIG. 5 shows an example display appearing on the LCD of the notebook PC when the notebook PC executes the electronic photo album software.
Figure 6:
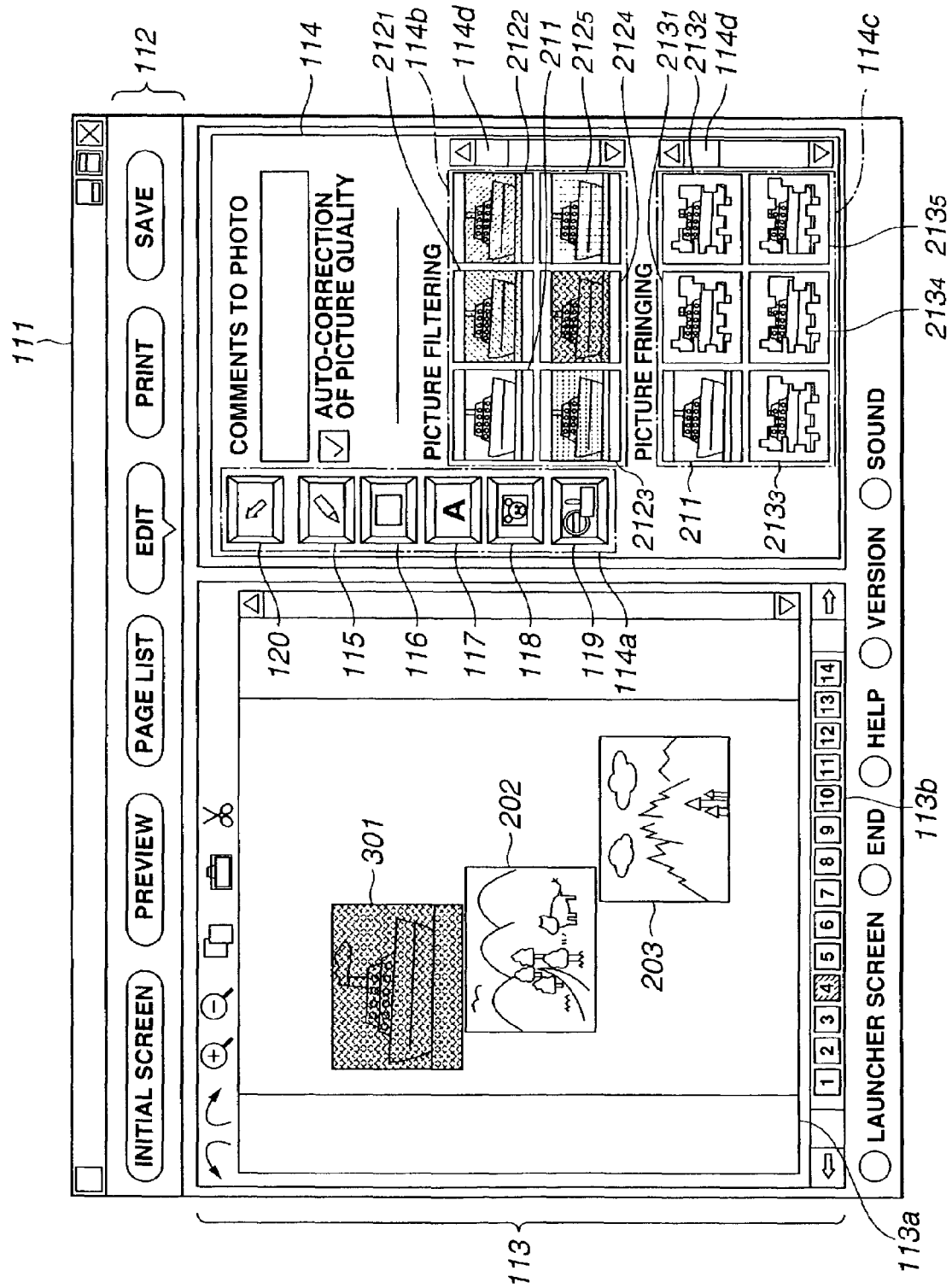
FIG. 6 shows an example display on the LCD of the notebook PC when the notebook PC executes the electronic photo album software.

The menu select section 112 and picture display sections 113 and 114 included in the photo album window 111 are used in common in the edit menu, and form together a photo album window 131 shown in FIG. 5 and a photo album window 141 shown in FIG. 6.

The photo album window 131 shown in FIG. 5 is intended for displaying the picture 201 selected from the pictures 201 to 203 in the picture display area 113a by operating the touch pad 6. That is, the picture 201 is selected as a picture to be processed.

The photo album window 131 consists of a menu select section 112, picture display section 113 including a picture display area 113a and a page number display area 113b, and a picture display section 114 including an edit mode select area 114a, thumbnail display area 114b, thumbnail display area 114c and a scroll 114d. The same window components as those having been described above with reference to FIG. 4 will be indicated with the same references as in FIG. 4, and will not be described in detail.

The thumbnail display area 114b displays a thumbnail 211 of the target picture 201 and thumbnails $212_1$ to $212_n$ (n is an integer) obtained via applying various kinds of filtering to the thumbnail 211.

The thumbnail display area 114c displays a thumbnail 211 of the target picture 201, and thumbnails $213_1$ to $213_n$ obtained via applying various kinds of patterning to the thumbnail 211.

Note that the thumbnails 211 and $212_1$ to $212_n$ displayed in the thumbnail display area 114b are listed. Similarly, the thumbnails 211 and $213_1$ to $213_n$ displayed in the thumbnail display area 114c are also listed.

In the thumbnail display areas 114b and 114c, there are displayed a total of six thumbnails, displayable at the same time, including two vertical ones and three horizontal ones. Thus, when the scroll bar 114d is operated by operating the touch pad 6, thumbnails not yet displayed are displayed one after another.

The photo album window 141 shown in FIG. 6 is a display screen when for example the thumbnail $212_4$ is selected in the thumbnail display area 114b.

The photo album window 141 consists of a menu select section 112, picture display section 113 including a picture display area 113a and a page number display area 113b, and a picture display section 114 including an edit mode select area 114a, thumbnail display area 114b, thumbnail display area 114c and a scroll 114d. The same window components as those having been described above with reference to FIGS. 4 and 5 will be indicated with the same references as in FIGS. 4 and 5, and will not be described in detail.

In the photo album window 141, the pictures 301, 202 and 203 are displayed in the picture display area 113a of the picture display section 113. The picture 301 is a result of the picture processing made with the filtering having been applied to the thumbnail $214_4$ applied to the picture 201.

Figure 7:
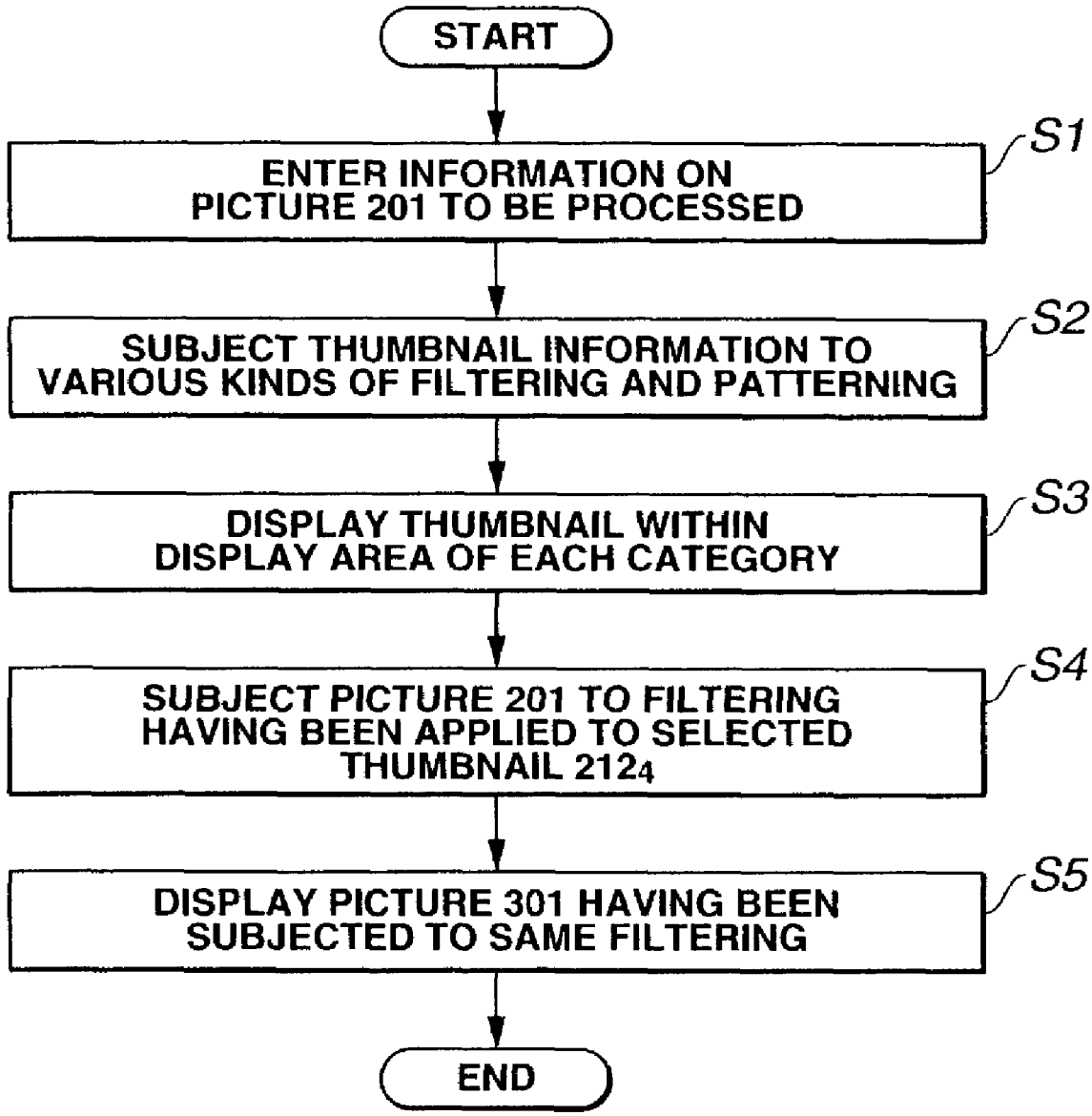
FIG. 7 shows a flow of operations made in picture processing made according to the electronic photo album software executed by the notebook PC.

Next, the operations of th CPU 51 in the picture processing mode will be described with reference to the flow chart shown in FIG. 7. It is assumed here that in the initial status, the photo album window 111 shown in FIG. 4 appears on the LCD 7.

In step S1, information on the picture 201 selected, by operating the touch pad 6, from the pictures 201 to 203 displayed in the picture display area 113a shown in FIG. 4 is supplied as a target picture to the filtering unit 102 and patterning unit 103.

In step S2 the filtering unit 102 minifies the information on the input picture 201 to a thumbnail and makes various kinds of filtering of the thumbnail information, while the patterning unit 103 minifies the information on the input picture 201 to a thumbnail and makes various kinds of patterning of the thumbnail information.

In step S3, the display control unit 104 is supplied with the thumbnail information filtered and patterned in various manners from the filtering unit 102 and patterning unit 103 and displays them on the thumbnail display area 114b and thumbnail display area 114c shown in FIG. 5.

In step S4, the controller 105 detects the kind of the filtering applied to a one, for example, the thumbnail $212_4$, selected by operating the touch pad 6, from the thumbnails $212_1$ to $212_n$ and $213_1$ to $213_n$ displayed in the thumbnail display areas 114b and 114c, respectively, shown in FIG. 5, and controls the filtering unit 102 for application of the filtering to the picture 201.

In step S5, the display control unit 104 displays the picture 301 having been subjected to the same filtering as that applied to the thumbnail $212_4$ in the filtering unit 102 controlled by the controller 105, in place of the picture 201 in the picture display area 113a.

As having been described in the foregoing, since the notebook PC 1 to which the present invention is applied includes the picture processor 101 in which the CPU 51 can execute the electronic photo album software, the thumbnails $212_1$ to $212_n$ subjected to various kinds of filtering and $213_1$ to $213_n$ subjected to various kinds of patterning can be displayed in the form of a list along with the target picture 201 in the thumbnail display areas 114b and 114c, respectively, on the LCD 7 as shown in FIG. 5.

Thus, viewing the above thumbnails, the user can accurately recognize the contents and differences of various kinds of picture processing applicable to the picture 201 and easily search thumbnails having been subjected to desired kinds of picture processing by operating the touch pad 6 to move the scroll bar 114d.

Further, in the notebook PC 1, the filtering applied to a thumbnail, for example, the thumbnail $212_4$, selected by operating the touch pad 6 can be applied to the picture 201 and a result of the picture processing can be displayed as the picture 301.

Thus, the user can intuitively select a desired kind of picture processing just with a simple operation of the touch pad 6 without having to repeat the picture previewing as before.

Note that the present invention is not limited to the aforementioned embodiment but can be modified in various forms without departing from the spirit and scope thereof.

For example, the filtering and patterning are employed as picture processing techniques according to the aforementioned one aspect of the present invention, but it is of course that they may be replaced with any other appropriate picture processing techniques or any other appropriate picture processing technique may be added to them.

Also, the present invention has been described concerning the one aspect in which the present invention is applied to a notebook PC 1, but according to another aspect, the present invention can be applied to a portable digital assistants (PDA) for example.

Figures 8A, 8B:
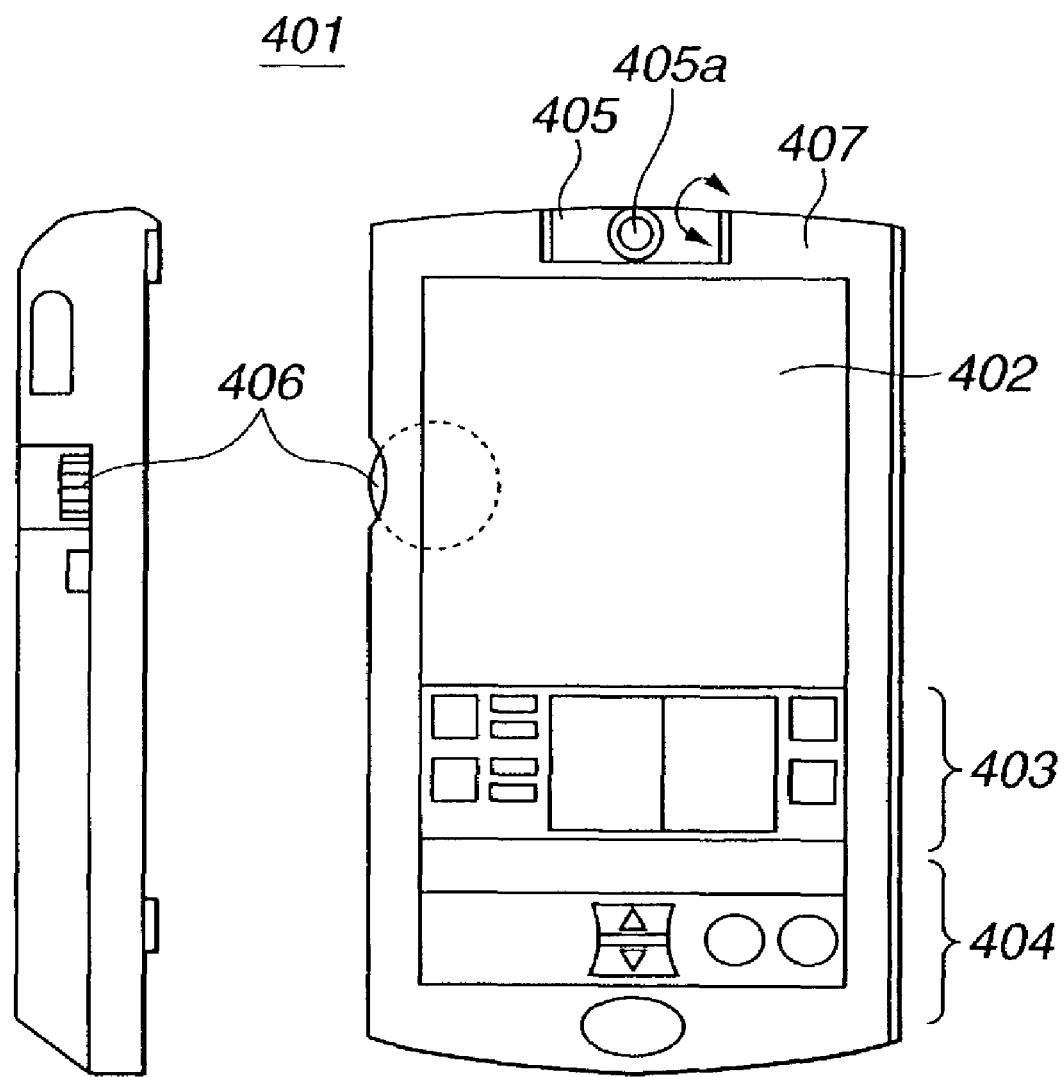
FIG. 8 shows the appearance of a PDA (portable digital assistants) as another example to which the present invention is also applicable.

Referring now to FIG. 8, a PDA is schematically illustrated in the forms of side elevation and front view. The PDA is generally indicated with a reference 401. As shown in FIG. 8(a), the PDA 401 has a housing 407 having provided on the front surface thereof a display section 402 being an liquid crystal display (LCD) which can provide a monochromatic or color display, a pen-operated input section 403 at which an operating pen or the like (not shown) is used to make an input, a control section 404 provided with controls to give a command or the like for starting up an application program installed in the PDA 401, and a camera 405 which acquires a picture of an object through a lens 405a and generates digitized picture information. As shown in FIG. 8(b), the PDA 401 is further provided with a rotatable dial 406 which gives the PDA 401 a command for execution of each of available kinds of picture processing.

As having been described in the foregoing, the information processor according to the present invention can display, on a display means, information on a picture to be processed (target picture) and information on a plurality of thumbnails of the target picture, having been subjected to multiple kinds of picture processing of different categories, and apply, to the target picture information, a kind of picture processing applied to thumbnail information selected, by operating an operating means, from the information on the thumbnails subjected to the multiple kinds of picture processing of different categories, thereby permitting to select a final kind of picture processing with an improved convenience.

As above, the user can accurately recognize the contents and differences of available kinds of picture processing for processing information on a target picture. Thus, the user can select a desired kind of picture processing just with a simple operation of a control means without having to repeat the picture previewing as before.

Also, the information processing method according to the present invention can display, on a display means, information on a picture to be processed (target picture) and information on a plurality of thumbnails of the target picture, having been subjected to multiple kinds of picture processing of different categories, and apply, to the target picture information, a kind of picture processing applied to thumbnail information selected, by operating an operating means, from the information on the thumbnails subjected to the multiple kinds of picture processing of different categories, thereby permitting to select a final kind of picture processing with an improved convenience.

As above, the user can accurately recognize the contents and differences of available kinds of picture processing for processing information on a target picture. Thus, the user can select a desired kind of picture processing just with a simple operation of a control means without having to repeat the picture previewing as before.

Also, the information processing program according to the present invention can display, on a display means, information on a picture to be processed (target picture) and information on a plurality of thumbnails of the target picture, having been subjected to multiple kinds of picture processing of different categories, and apply, to the target picture information, a kind of picture processing applied to thumbnail information selected, by operating an operating means, from the information on the thumbnails subjected to the multiple kinds of picture processing of different categories, thereby permitting to select a final kind of picture processing with an improved convenience.

As above, the user can accurately recognize the contents and differences of available kinds of picture processing for processing information on a target picture. Thus, the user can select a desired kind of picture processing just with a simple operation of a control means without having to repeat the picture previewing as before.

What is claimed is:

1. An information processor, comprising:
   a picture generation means for minifying a target picture information to thumbnail information and generating multiple instances of processed thumbnail information by respectively applying, independently, a first category and a second category, of multiple kinds of picture processing to the thumbnail information; and
   a display control means for controlling a display to show the multiple instances of processed thumbnail information displayed and classified by the categories having been subjected to the multiple kinds of picture processing,
   wherein the display control means arranges each of the multiple instances of processed thumbnail information having been subjected to the first category of the multiple kinds of picture processing for display in a first predetermined display region of the display, and arranges each of the multiple instances of processed thumbnail information having been subjected to the second category of the multiple kinds of picture processing for display in a second predetermined display region of the display.

2. The information processor as set forth in claim 1, further comprising:
   a picture processing determination means for determining at least one kind of a picture processing to be applied to the target picture information corresponding to an input by a user based on the multiple instances of processed thumbnail information displayed; and
   a control means for performing a control operation so that the picture processing determined by the picture processing determination means is applied to the target picture information.

3. The information processor as set forth in claim 1, wherein the multiple kinds of picture processing include a filtering category and a patterning category.

4. The information processor as set forth in claim 1, wherein the display control means displays the multiple instances of processed thumbnail information having been subjected to the multiple kinds of picture processing one after another on the display area by scrolling the multiple instances of processed thumbnail information within the display area of each kind vertically by using a scroll bar when the multiple instances of processed thumbnail information cannot all be displayed in the display area of picture processing at a time.

5. The information processor as set forth in claim 1, wherein the display control means controls the display to show, in addition to the multiple instances of processed thumbnail information, a plurality of picture information including the target picture information on a photo album page area of the display, the target picture information being one of the plurality of picture information selected by a user.

6. The information processor as set forth in claim 1, wherein the controller is configured to control the display to show, in addition to the multiple instances of processed thumbnail information, a plurality of picture information including the target picture information on a photo album page area of the display, the target picture information being one of the plurality of picture information selected by a user.

7. An information processing method, comprising steps of:
   minifying target picture information to thumbnail information and applying, independently, a first category and a second category, of multiple kinds of picture processing to the thumbnail information to generate multiple instances of processed thumbnail information; and
   displaying the multiple instances of processed thumbnail information displayed and classified by the categories on a display so as to visually demonstrate an affect of the multiple kinds of picture processing on the target picture information,
   wherein in the displaying step, each of the multiple instances of processed thumbnail information having been subjected to the first category of the multiple kinds of picture processing are arranged for display in a first predetermined display region of the display, and each of the multiple instances of processed thumbnail information having been subjected to the second category of the multiple kinds of picture processing are arranged for display in a second predetermined display region of the display.

8. The method as set forth in claim 7, further comprising:
determining at least one of the multiple kinds of picture processing to be applied to the target picture information corresponding to an input by a user based on the multiple instances of processed thumbnail information displayed; and
performing a control operation so that the picture processing determined in the determining step is applied to the target picture information.

9. The method as set forth in claim 7, wherein the step of applying multiple kinds of picture processing comprises applying the multiple kinds of picture processing that include a filtering category and a patterning category.

10. The method as set forth in claim 7, wherein in the displaying step, the multiple instances of processed thumbnail information are displayed one after another on a display area of a display by scrolling the multiple instances of processed thumbnail information within the display area of each kind of picture processing vertically by using a scroll bar when the multiple instances of processed thumbnail information cannot all be displayed in the display at a time.

11. The method as set forth in claim 7, wherein the step of displaying the multiple instances comprises displaying, in addition to the multiple instances of processed thumbnail information, a plurality of picture information including the target picture information on a photo album page area of the display, the target picture information being one of the plurality of picture information selected by a user.

12. A computer readable storage medium, including computer executable instructions, having embedded therein the instructions, when executed by a processor, cause the processor to perform a method, comprising:
minifying a target picture information to thumbnail information and generating multiple instances of processed thumbnail information by respectively applying, independently, a first category and a second category, of multiple kinds of picture processing to the thumbnail information; and
controlling a display to show the multiple instances of processed thumbnail information displayed and classified by the categories having been subjected to the multiple kinds of picture processing,
wherein in the controlling step, each of the multiple instances of processed thumbnail information having been subjected to the first category of the multiple kinds of picture processing are arranged for display in a first predetermined region of the display, and each of the multiple instances of processed thumbnail information having been subjected to the second category of the multiple kinds of picture processing are arranged for display in a second predetermined region of the display.

13. The computer-readable storage medium as set forth in claim 12, wherein the step of controlling the multiple instances comprises displaying, in addition to the multiple instances of processed thumbnail information, a plurality of picture information including the target picture information on a photo album page area of the display, the target picture information being one of the plurality of picture information selected by a user.

14. An information processor, comprising:
a picture generation mechanism configured to minify a target picture information to thumbnail information and to generate multiple instances of processed thumbnail information by respectively applying, independently, a first category and a second category, of multiple kinds of picture processing to the multiple instances of thumbnail information; and
a controller configured to control a display to show the multiple instances of processed thumbnail information displayed and classified by the categories after being subject to the multiple kinds of picture processing,
wherein the controller is further configured to arrange each of the multiple instances of processed thumbnail information having been subjected to the first category of the multiple kinds of picture processing for display in a first predetermined region of the display, and to arrange each of the multiple instances of processed thumbnail information having been subjected to the second category of the multiple kinds of picture processing for display in a second predetermined region of the display.

* * * * *